Patented Apr. 2, 1935

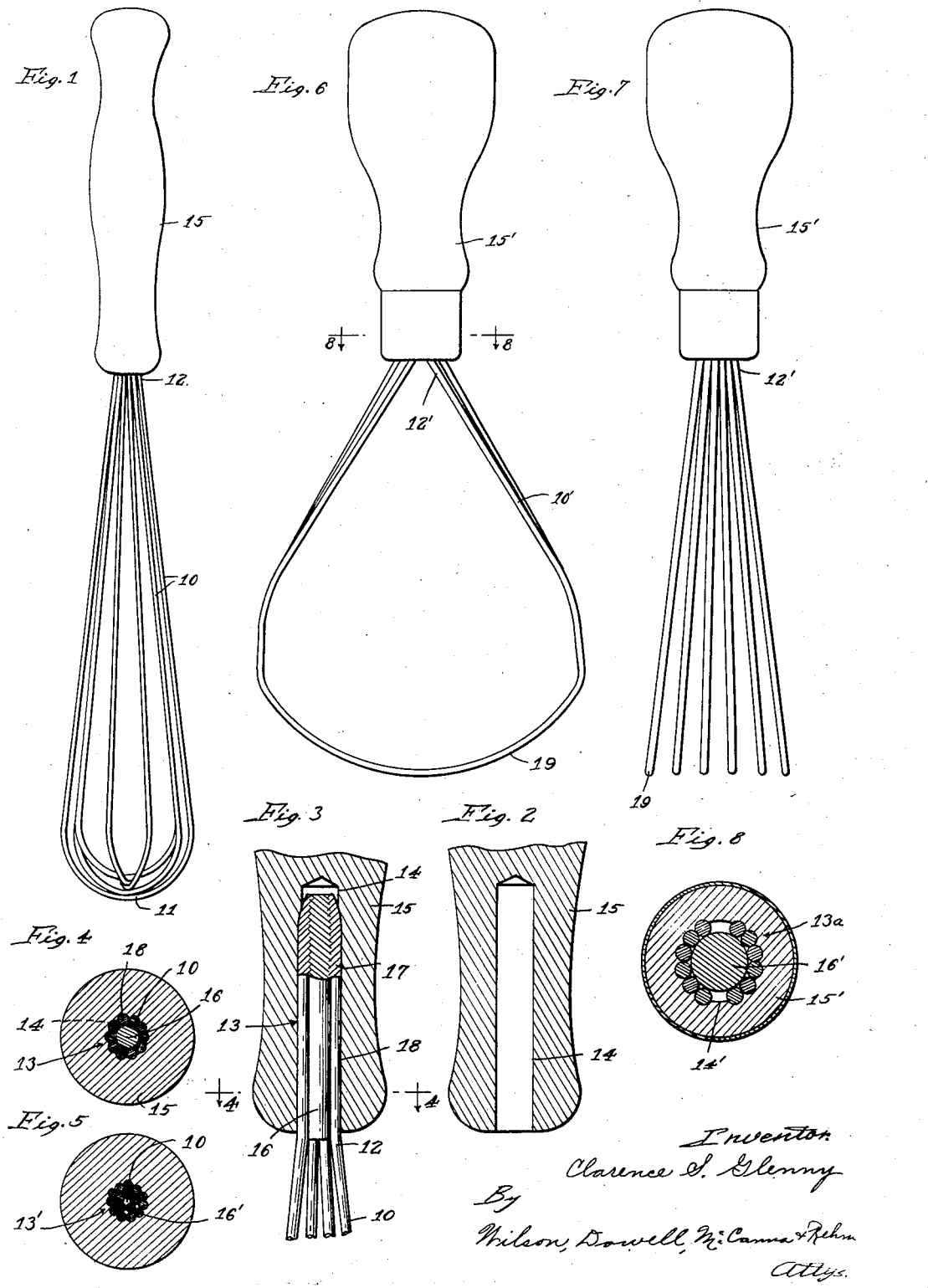

1,996,240

UNITED STATES PATENT OFFICE 1,996,240

HOUSEHOLD UTENSIL

Clarence S. Glenny, Rockford, Ill., assignor to The Washburn Company, Worcester, Mass., a corporation of Massachusetts Application May 11, 1932, Serial No. 610,626

1 Claim. (Cl. 259—144)

This invention relates to household utensils generally, such as eggbeaters, dough blenders, and even carpet beaters, and has for its principal object an improved handle construction.

The handle in accordance with my invention is arranged to have a press fit on the shank of the utensil, and the shank, by reason of its special construction, is arranged to score grooves in the wood of the handle as it enters the hole therein, thus making the handle absolutely rigid and so tight that there is no danger of its ever working loose and coming off.

Another object is to provide a dough blender of improved construction having the handle thereof fastened in the manner set forth.

The invention is illustrated in the accompanying drawing, in which—

Figure 1 shows an egg beater embodying the handle construction of my invention;

Fig. 2 is a longitudinal section through the handle prior to entry of the shank;

Fig. 3 is a similar view showing the shank inserted;

Fig. 4 is a cross-section on the line 4—4 of Fig. 3;

Fig. 5 is a similar view but showing a modified construction;

Figs. 6 and 7 are views in two planes of the dough blender of my invention, and

Fig. 8 is a cross-section on the line 8—8 of Fig. 6.

The same reference numerals are applied to corresponding parts throughout the views.

Referring to Figures 1-4 illustrating the egg beater, the numeral 10 designates a plurality of beaters of spring wire which are bowed, as at 11, and have the free ends clustered, as indicated at 12, for entry of the shank 13 in the hole 14 provided in the end of the handle 15. The shank 13 is made up of a short heavy wire 16 around which the ends of the wires 10 are clustered and welded thereto, as at 17. This gives the shank a longitudinally fluted or corrugated surface as must appear from examination of Fig. 4 in which the shank appears in cross-section, the individual wires each defining a longitudinal rib on the shank. Thus, when the handle 15 is pressed onto the shank the hole 14 is scored lengthwise by these wires, the hole being sufficiently undersize for that purpose, so that longitudinal grooves 18 are provided in the handle for the reception of the wires when the shank has been driven home. To simplify matters and make for greater economy the ends of the wires 10 need not be and are preferably not welded to the wire 16 for the full length of the latter, it being sufficient to weld, say, one-third the length of the center wire, or even less. In that way, the wires tend to spring away from the outer end of the pin 16 into tighter engagement in the hole. In other words, the shank has a friction hold in the handle the full length of the hole, but at the outer end of the hole the wires of the shank exert pressure resiliently against the sides of the hole to further insure good anchorage and a permanent fastening. The end of the shank is preferably tapered slightly as appears in Fig. 3 so as to enable easy entry in the hole in the handle. The advantages of this construction are its economy and its durability as well as sanitation. So far as durability is concerned it is clear the fastening is about as firm as the driving of a nail into wood with the additional binding due to the spreading of the wires of the shank against the sides of the hole, and there is no likelihood of the handle turning relative to the shank or working off endwise. So far as sanitation is concerned, it is apparent that the center wire 16 plugs up the hole in the handle so that dirt cannot collect therein.

As shown in Fig. 5, the center wire 16 may be dispensed with if there is a sufficient number of beater wires 10 to fill in the center of the shank, as indicated at 16', or if the same number of wires as were otherwise used are welded together without a center piece to form a smaller shank to fit a smaller hole. In other words, the wires are clustered together to cylindrical form and then welded into an integral shank 13' which, so far as its surface characteristics are concerned, is practically the same as the shank 13.

The dough blender shown in Figs. 6-8 comprises wires 10', formed so as to provide tread portions 19 in spaced relation to one another, as indicated in Fig. 7, for the purpose of mixing or blending ingredients in pastry making. The wires are clustered together, as appears at 12', where the shank 13a enters the hole 14' in the handle 15'. A center wire 16' is provided around which the ends of the wires 10' are clustered and to which the same are welded similarly as in the first construction. In this kind of utensil, where one has access to the end of the center wire, the shank can be driven into the handle very easily by means of this wire.

Dough blenders were heretofore made so that the handle was disposed horizontally, and the ends of the wires extended up to the opposite ends of the handle and were held by plates fastened to the handle. That type was too expensive and furthermore was not as handy to manipulate as the present type. This dough blender does not tend to turn in the hand as pressure is brought to bear thereon, like the other type did. Furthermore, any looseness of the handle on the other type put the utensil out of commission, whereas it would be no serious handicap as I have the handle.

It is believed the foregoing description conveys a good understanding of the objects and advantages of my invention. The appended claim has been drawn so as to cover all legitimate modifications and adaptations.

I claim:

A utensil comprising a plurality of wires having the ends thereof arranged to be secured in a hole in a handle, a center wire around which the ends of the other wires are clustered to form a substantially cylindrical bundle, said center wire having only a short end portion thereof secured to the extremities of the other wires whereby to leave the wires free of the rest of the center wire and normally flared away from it, the center wire with the other wires secured thereto forming, in effect, a one-piece longitudinally ribbed or fluted shank, and a handle of softer material than the wires having said shank driven into a hole provided therein, the construction described resulting in the grooving of the hole by the wires as the shank is driven into place and resulting further in a friction hold of the shank in the hole the full length of the latter with the additional resilient pressure of the wires against the sides of the hole at the outer end of the latter for better anchorage of the shank in the hole.

CLARENCE S. GLENNY.